US009202085B2

(12) United States Patent
Mawdsley et al.

(10) Patent No.: US 9,202,085 B2
(45) Date of Patent: Dec. 1, 2015

(54) PRIVATE INFORMATION STORAGE SYSTEM

(75) Inventors: Gary Mawdsley, Kirby Lonsdale (GB); Steven Meyfroidt, Penrith (GB)

(73) Assignee: Kube Partners Limited, Kendal, Cumbria (GB)

( * ) Notice: Subject to any disclaimer, the term of this patent is extended or adjusted under 35 U.S.C. 154(b) by 640 days.

(21) Appl. No.: 13/302,561

(22) Filed: Nov. 22, 2011

(65) Prior Publication Data

US 2012/0131075 A1 May 24, 2012

Related U.S. Application Data

(60) Provisional application No. 61/417,647, filed on Nov. 29, 2010.

(30) Foreign Application Priority Data

Nov. 23, 2010 (GB) .................................. 1019825.7

(51) Int. Cl.
*G06F 17/30* (2006.01)
*G06F 21/62* (2013.01)
*H04L 29/06* (2006.01)

(52) U.S. Cl.
CPC ........ *G06F 21/6254* (2013.01); *H04L 63/0407* (2013.01)

(58) Field of Classification Search
CPC ............ G06F 21/6254; G06F 21/6245; H04L 2209/56
USPC ....................................................... 707/825
See application file for complete search history.

(56) References Cited

U.S. PATENT DOCUMENTS

| | | | | |
|---|---|---|---|---|
| 6,397,224 | B1 * | 5/2002 | Zubeldia et al. ...................... | 1/1 |
| 7,587,368 | B2 * | 9/2009 | Felsher ........................... | 705/65 |
| 7,974,942 | B2 * | 7/2011 | Pomroy et al. ................ | 707/610 |
| 8,478,765 | B2 * | 7/2013 | Barton et al. ................. | 707/756 |
| 2006/0059189 | A1 | 3/2006 | Dunki et al. | |
| 2006/0080554 | A1 | 4/2006 | McDonald et al. | |
| 2007/0027807 | A1 * | 2/2007 | Bronstein ....................... | 705/44 |
| 2008/0229394 | A1 * | 9/2008 | Stering et al. ..................... | 726/4 |
| 2011/0010563 | A1 * | 1/2011 | Lee et al. ...................... | 713/189 |
| 2011/0307486 | A1 * | 12/2011 | Breslau et al. ................ | 707/737 |

FOREIGN PATENT DOCUMENTS

| | | | |
|---|---|---|---|
| EP | 1637955 A1 | 3/2006 | |
| EP | 1688860 A1 | 8/2006 | |
| EP | 1909211 A1 | 4/2008 | |

* cited by examiner

*Primary Examiner* — Sheree Brown
(74) *Attorney, Agent, or Firm* — Loginov & Associates, PLLC; William A. Loginov

(57) ABSTRACT

This invention relates to a scheme for storage of private information on a cloud computing platform without contravention of territorial privacy laws. A method of anonymising a database of personal data is described whereby data identifiers are assigned to data items and deviation identifiers are assigned to deviations for selected data items derived from reference records. Such information can then be uploaded to a cloud based storage platform. A translation table maps the data items, data identifiers and deviation identifiers to the original data entries. This translation table is stored locally and separate to the anonymised information uploaded to the cloud. The invention further describes a method of decoding the database anonymised according to the above method.

25 Claims, 4 Drawing Sheets

PRIVATE INFORMATION STORAGE SYSTEM

RELATED APPLICATIONS

This application claims the benefit of U.S. Provisional Patent Application Ser. No. 61/417,647, filed Nov. 29, 2010, entitled PRIVATE INFORMATION STORAGE SYSTEM, the entire disclosure of which is herein incorporated by reference.

FIELD OF THE INVENTION

This invention relates to a scheme for storage of private information on a cloud computing platform without contravention of territorial privacy laws.

BACKGROUND OF THE INVENTION

Legal requirements for protection of personal data mean that in many countries restrictions are imposed on where such information can be stored. Even if the content is encrypted many data protection laws prevent such information from being transferred out of the country—there is always the risk of increasingly advanced algorithms or leakage of the passwords or encryption keys meaning that information may ultimately be leaked and accessible. However, it can be useful to have access to such information, even in a restricted form, to allow general trend analysis without needing any link or reference back to individuals the data is associated with.

The rapid and continuous increase in data storage and processing means that more and more companies are moving their storage and processing requirements to cloud based systems, which may be located out of the particular country in question. Furthermore, cloud storage and processing providers typically may distribute or migrate content across multiple geographic sites as a form or redundancy or to assist with load balancing. Even if one were to upload personal content to a cloud in the local territory backups may be made to other clouds throughout the world. Using such cloud based systems for storage and processing is however advantageous due the ability to scale as storage and processing demands increase.

There is therefore a need for a system whereby information can be stored remotely, in particular personal information, whilst still meeting requirements for protection of personal data.

SUMMARY OF THE INVENTION

According to a first aspect of the invention there is provided a method of anonymising a database of personal data, the database comprising a plurality of data records, each data record comprising a plurality of data items, the method comprising; for a subset of data items in said data records, determining a deviation of each of said data items in said data records relative to reference data items in a reference record, and assigning deviation identifiers to each of said determined deviations in said data records to anonymise said data items in said subset of said data items in said data records; generating a translation table mapping said data items in said subset to said deviation identifiers; storing said translation table; and storing said deviation identifiers defining said anonymised data items for said data records remotely to said translation table.

Preferably the method further comprises assigning data identifiers to a second subset of said data items in said data records to anonymise said data items in said second set of said data items in said data records; wherein said generating a translation table further comprises mapping said data items in said second subset to said data identifiers; and further comprising storing said data identifiers remotely to said translation table.

Typically the data identifiers may refer to personal details such as name, contact details and address for example—i.e. alphanumeric data, although it may not be necessary to store data identifiers—instead only deviation identifiers may need to be stored. The deviation identifiers, used to identify data that is recorded as deviations to reference data items in a reference record, typically refer to numerical data such as financial data. Such deviations may provide useful information for statistical and characterising purposes without revealing any association or reference to the actual values or personal data that such numerical information is linked to. Each of the subsets of data may comprise of one or more data items.

The identifiers and the translation table (that links the identifiers to the original personal and numerical data) are stored independent to one another, preferably on different computing machines to ensure the translation table is held and stored securely and only available to authorised persons. The result is that the data is both obfuscated and divided—data allowing an association between the identifiers and the personal information is still held within the local territory to comply with mandated privacy laws, but the identifiers can be stored anywhere. In privacy terms, this is the first privacy enhancing technology (PET) layer. The identifiers contain obfuscated information meaning that even if someone were to obtain the identifier information, no personal information could be determined. This approach differs to encryption techniques such as public key encryption because information is divided and links to personal information are only obtainable by also having the translation table available.

In addition, from a regulatory perspective it may not be lawful to access the real unobscured data even for processing in the statistical analysis method referenced above. Accordingly embodiments of the invention herein described allow such analysis to be performed on the obfuscated data using the identifiers whilst meeting regulatory requirements Advantageously the translation table may typically be orders of magnitude smaller in size to the identifiers storing the main body of data. This reduces the local storage requirements allowing the mass storage to be pushed out to a cloud computing platform for example without contravening national data protection laws.

Preferably the method further comprises generating the reference record. The reference record, used to enable determination of deviations to data items in the data records may be generated by deriving one or more reference data items defining a characteristic profile of data items in records already stored in the database and thus may be updated and modified over time (consequently the deviations and identifiers will also then need re-computing). The reference records may be determined by analysing of one or more of the data records already stored in the database, alternatively it may be from alternative data gathered independent to the database of data records such as from market analysis, trends or general statistical information related to the nature of the content stored within the database. Each reference record effectively defines the different 'pools' into which each of the data records are classified, the deviations for each record determined relative to reference data items in the reference record for that particular pool. Furthermore, as more records are added to the database, the characteristic profile(s) may be dynamically updated dependent on the new records.

Preferably reference data identifiers are assigned to the reference data items in the reference record. These reference data identifiers may then also be stored, preferably remotely to the translation table. The translation table then further stores a mapping of the reference data items to the reference data identifiers so that a during decoding of the anonymised database the content of the reference data record may be determined. In some embodiments the reference data identifiers are stored with the data identifiers and deviation identifiers which are also stored remotely to the translation table. This then allows all the identifiers to be retrieved together from the same location, which may be for example from remote storage within a cloud computing environment.

In some preferred embodiments there may be a plurality of reference records each storing different reference profiles for different characteristic groups of data records (for example different characteristic groups of users who may fit have different types or ranges of financial information). To determine the deviations it may then be necessary to select a reference record by which to derive this deviation. This may be done by generating a deviation for one or more of the data items against each reference record and then comparing the similarity of the record to the referenced records to select the deviation to store one may then compare the similarity of records and then select the closest matching reference record.

In embodiments where multiple reference records are used it may be necessary to further store a marker in a data record so that when the data is later decoded for the data record the appropriate reference record can be retrieved to allow the deviations to be combined with the reference record data to regenerate the original data field value. Alternatively the marker could be to a particular data item in a reference record or may be more generally related to a particular reference record.

Preferably the translation table is stored on a client machine and the data identifiers (if present) and the deviation identifiers are stored on a remote data server. The remote data server for example may be stored on a remote cloud computing platform. As the data identifiers and deviation identifiers contain anonymised information no personal information can be extracted from this data thereby allowing storage of such information anywhere within the world to maintain compliance with territorial privacy laws. In particular with UK and EU privacy laws, for example, the translation table may be stored on computing machines located only within permitted territories thereby ensuring full compliance with local laws. It will be appreciated however that data may still be anonymised according to the methods herein described even if the identifiers are not pushed out to a remote clouding computing platform.

In some preferred embodiments the one or more of the translation table, data identifiers (if present) and deviation identifiers may be encrypted (such as with asymmetric public key encryption for example). More preferably the method further comprises applying one or more further layers of encryption, in particular wherein one of said one or more further layers of encryption is a proprietary format such that further layers of protection (further PET layers) are added to the data stored either locally or remotely on the cloud. This adds further layers of security to the information. It will be appreciated however that the process of obfuscation and dividing described herein differs to encryption techniques such as public key encryption because even if the identifiers stored within the cloud were accessed by an unauthorised person the data contains no information to link it back to personal information (which is held elsewhere in the translation tables). Furthermore, even if multiple PET encryption layers were applied to the identifiers, circumvention of such encryption would still only lead to availability of the obfuscated identifiers thus maintaining at least the first PET layer. Depending on the nature of the encryption methodology, it may be possible to analyse trends in the data, although it will be appreciated that in some circumstances the company storing such information may not wish to perform such analysis and thereby encrypt different elements of the personal data to prevent such analysis. One or more of the PET layers may be a proprietary format, i.e. a unique form of encryption applied by the organisation holding the content.

In embodiments of the invention the data items in the data records are arranged into fields. The process of determining a deviation comprises determining a deviation of each of the data items relative to a data item in a corresponding field in the reference record. For example if a particular numerical field refers to pension financial information the deviation could be compared to similar pension information details in the reference record.

Preferably the first subset of data comprises data defining personal data and the second subset of data comprises financial data linked to the personal data although it will be appreciated that other forms of data may be stored and the invention is not limited to the storage of financial data only. Information stored may include names, addresses, ages, contact details, and financial information include shares and investments, pensions and bank account details. It will be appreciated that further content may also be stored and these are examples only of such content.

Preferably the reference record comprises a common financial profile comprising pre-characterised financial data. Thus the reference record and the data record all typically refer to financial information, including details such as pension information, investments, bank account details and the like. The reference record may be structured in a similar way to the data records for customers to provide a direct mapping for determining deviation of numerical data or alternative may take on a different structure.

According to a second aspect of the invention there is provided a method of decoding a database of personal data anonymised according to the method of the first aspect of the invention, the database comprising a plurality of data records, each data record comprising a plurality of data items, the method comprising; retrieving deviation identifiers for a subset of said data items in remote data record from remote storage, wherein said deviation identifiers define anonymised deviations for each of said data items in said data records relative to reference data items in a reference record; retrieving a translation table from storage, wherein said storage is distinct to said deviation identifiers, and wherein said translation table defines a mapping of said data items in said subset with said deviation identifiers; processing said deviation identifiers using said reference record and said translation table to decode said database of personal data; wherein said processing comprises performing a reverse mapping of said deviation identifiers to deviations of each of said data items in said subset of data items and, using said reference record and said deviations, determining said data items in said subset of data items.

Preferably the method further comprises: retrieving data identifiers for a second subset of said data items in said remote data record from said remote storage (distinct, i.e. separate to the storage of the translation table which may be stored locally to comply with national data protection laws), said data identifiers defining anonymised data items in said remote data record; wherein said translation table further defines a mapping of said data items in said second subset with said data identifiers; wherein said storage of said translation table is distinct to said data identifiers; wherein said processing further comprises processing said data identifiers and said translation table to decode said database of personal data; and wherein said processing further comprises performing a reverse mapping of said data identifiers to said data items in said second subset of data items.

Preferably the translation table further maps the reference data items to the reference data identifiers. This requires retrieving reference data items from remote storage (which may be the same remote storage as the data identifiers (if present) and deviation identifiers). These are then be processed using the translation table (typically stored locally) to perform a reverse mapping of the reference data identifiers to the reference data items for the reference record. By having the reference record (or multiple reference records) then decoded this information can be used in conjunction with the deviations in the subsets of data items to determine the original numerical values of those particular pieces of information.

Portable devices, such as laptops, tablet style devices are particularly suited to use as a tool for decoding the obfuscated data to reassemble the original data set. Given that the translation table may typically be orders of magnitude smaller than the identifiers, even devices with only a nominal amount of storage (for example limited flash storage) such as tablet style devices will have sufficient storage capacity to keep the translation table stored locally. In such systems the process of decoding and reassembly of data may be performed through provision of a web-based application for example, hosted either locally or remotely.

In some preferred embodiments there is a plurality of reference records, therefore the processing further comprises selecting one of the plurality of reference records before using the deviation information to determine the original values.

Given multiple reference records, in preferred embodiments one of the data items in the data record comprises a marker defining the reference record which is used to determine the anonymised deviation. This then enables the relevant reference record to be determined in order to use the particular deviation to decode and derive the original value. The selecting process therefore comprises reading a particular marker to determine which reference record to use. Alternatively in some preferred embodiments the process of selecting comprises determining a difference between the deviations in at least one of the data items in the subset and at least one of the reference data items in the plurality of reference records. The relevant reference record to use is then selected dependent on the difference between the deviations (typically the minimum deviation will be selected to determine the relevant reference record).

Preferably the translation table is stored on a client machine used in the territory in which legal compliance with personal data storage must be maintained. The data identifiers (if present) and the deviation identifiers may also be stored on a remote data server which may be located within a remote cloud computing platform which may be anywhere in the world. Given that the identifiers contain no personal information (they provide only identifiers requiring the locally stored translation table to ascertain the stored information), there are fewer restrictions on where this information can be stored, i.e. cloud based storage is now possible.

In some preferred embodiments the translation table may be stored remotely to the remote data server and downloaded onto the client machine. For example the translation table may be stored on a server for a company within the territories allowed to store personal information and downloaded for example over a secure internet connection to the client computer when an adviser wishes to access such information.

In some preferred embodiments the data identifiers (if present), deviation identifiers and or translation table may have previously have been encrypted, therefore processing further requires decrypting this information in order to decode the database of personal data.

The invention further provides a client computer machine configured to implement the methods as described in the first and second aspects of the invention. It will be appreciated that these may be one and the same computing machine or may be independent computing machines.

According to a further aspect of the invention there is provided a database management system for decoding a subset of data items in data records from a distributed database, the distributed database comprising: a plurality of deviation identifiers storing anonymised references to deviations in a subset of data items in data records, wherein the deviations define deviations of the subset of data item to a reference data item in a reference record; the database management system comprising: a data dictionary comprising a translation table storing mappings from the subset of data items to the deviation identifiers; a transaction engine to retrieve one or more of the plurality of deviation identifiers from remote storage, to retrieve the translation table, and to retrieve the reference record; a query engine to process the deviation identifiers using the reference record and the translation table to decode the distributed database and reconstitute the subset of data items in the data records, wherein the decoding comprises performing a reverse mapping of the deviation identifiers to deviations of each of the data items in the subset of data items and, using the reference record and the deviations, determining the data items in the subset of data items.

The database management system (DBMS) allows conventional database interactions to interface to the distributed storage system, performing the database queries and accessing the cloud storage. In combination with the translation table and any necessary reference data values the original data in its original decoded form can be determined.

In preferred embodiments there is provided a data marshaller to generate the reference record. The generating comprises determining one or more reference data items defining a characteristic profile of data suitable for storing in the database and thus allows the deviations to be derived. In some preferred embodiments the characteristic profile is determined from data items stored in the distributed database, i.e. from existing data by performing an analysis to characterise and identify profiles. Alternatively however it will be appreciated that such profile information may be determined from other sources and added to the system for use as an additional characteristic profile. This may be useful in situations whereby a particular characteristic profile is of interest to the particular system owner. Furthermore, more preferably the data marshaller is further operable to update the deviation identifiers in the distributed database and the data dictionary responsive to the generating of the reference record so that the new reference record/profile is fully integrated and used within the database. The data marshaller manages the structure of the underlying cloud storage facility and enables the reference records to be generated, updated and additional reference records added as and when new profiles are identified and incorporated into the system allowing the remote storage to be updated and adjusted according to newly identifier characteristic trends and profiles in data.

In some preferred embodiments of the database management system one or more of the translation table and the deviation identifiers are encrypted to provide additional layers of privacy enhancing technology (PET)/security to the system. For example, one could want to restrict access to the translation table to prevent unauthorised access to this information. Additionally, with further layers of encryption added, the database management system preferably further comprises an authorisation engine to decrypt the one or more of the translation table and the deviation identifiers according to the encryption layers The invention further provides processor control code to implement the above-described methods, for example on a general purpose computer system or on a digital signal processor (DSP). The code may be provided on a carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

BRIEF DESCRIPTION OF THE DRAWINGS

The invention description below refers to the accompanying drawings, of which.

DETAILED DESCRIPTION

Figure 1:
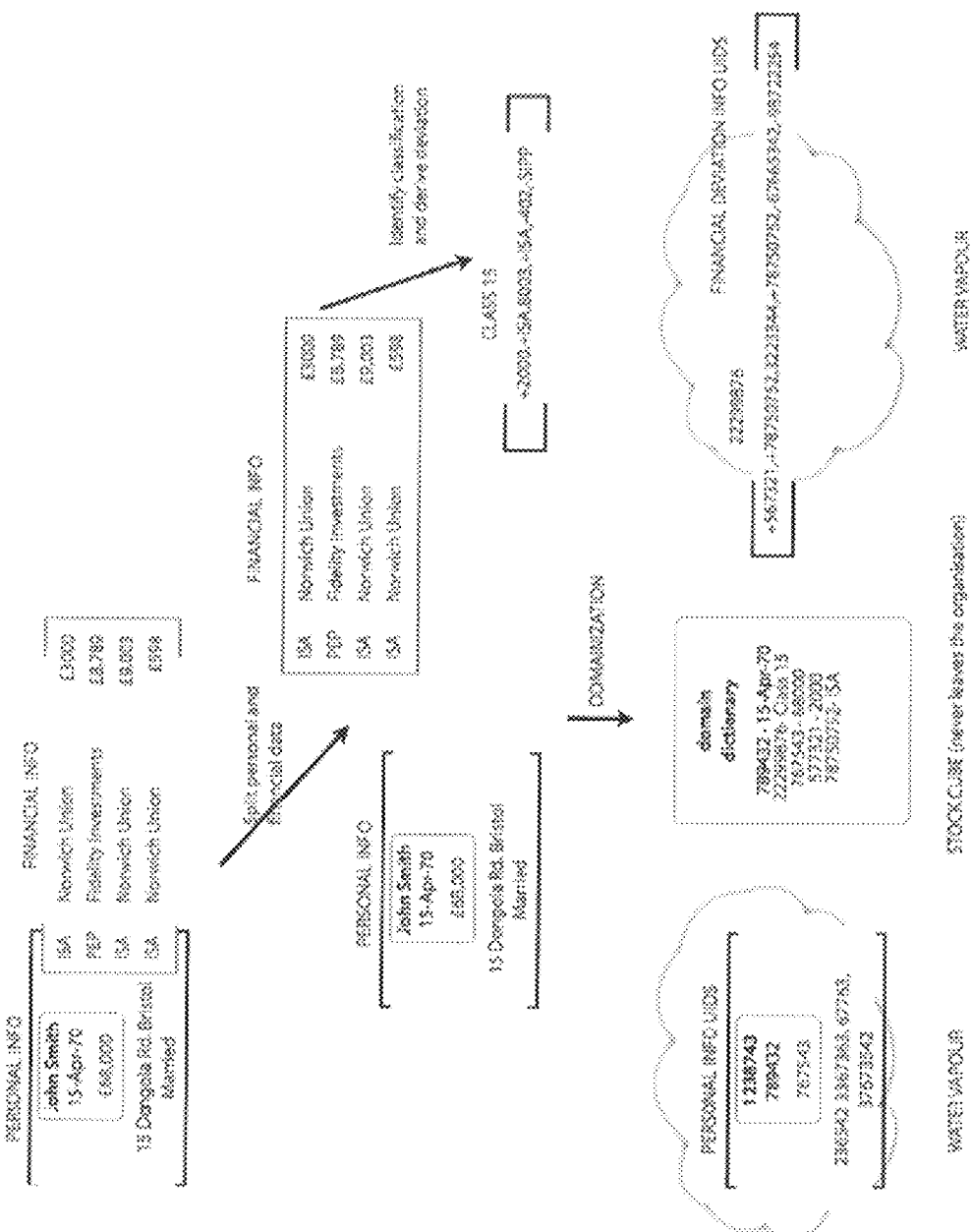
FIG. 1 shows the process of deriving the anonymised data.

We describe a scheme by which personal data and personal financial data can be stored in the Cloud and still be complaint with territorial privacy laws, in particular UK and EU privacy law. Although we refer to financial data in the example herein provided it will be appreciated that such discussion is general applicable to many forms of numerical data The scheme addresses the fundamental issues of storage of data and the legal mechanics of data separation, dispersal, and subsequent reassembly of the data into a meaningful view to an authorised person.

The process operates as a pseudonymising or obfuscation tool, by substituting elements of personal data and turning each of those elements into an identifier, which we call a Unique Identifier (UID). Each UID derives from a basic identifying data element, such as first name, surname, postcode or from financial data such as salary, expenditure, type of investment or value. Further, the UIDs created from the financial data falls into two categories: deviations and non-deviations. Each UID is made up of a multi-layered numerical code.

The process of turning data into initial UIDs is given the name: "domainizing" and results in a sequence of UIDs and a residue. The residue provides a translation table that maps/translates the UIDs to the underlying data, including names, address and financial data. Without this residue/translation data it is not possible to unveil the true identities and financial information within the personal data.

Further layers of encryption of the UIDs can also be added as will be described later. In privacy terms each layer is known as a PET layer—privacy enhancing technology layer. The initial translation to UIDs via domainizing is the first layer of PET.

In this way, the method and system incorporate additional security features and precautions such as multiple levels of non-conventional encryption techniques applied to such coded data prior to transmission both to and from the cloud.

The cloud provider will host data in the form of UID sequence derived from both the demographic data from client financial deviation data. The coded UID data can only be reconstituted through the application in the hands of the authorised users with access to the residue within the translation table.

The residual data is not stored in the Cloud, but instead within an organisation under the same controls for personal data as exists today.

Thus the system provides a mechanism where personal data can be stored in the cloud without territorial restriction in terms of privacy and compliance. Within the UK for example, privacy laws regulate the geographical locality of personal information storage. Personal UK financial data under this scheme can be stored legally in the Cloud. It will be appreciated under similar laws in other countries, information may also be stored in the Cloud. Cloud storage is not possible with standard encryption practices as the data is still stored, albeit in encrypted form potentially in non-permitted jurisdictions. Should any unauthorised person obtain access to the encrypted data, circumvention of the password, or password 'cracking' could allow them access to the data and the personal information. By adding the obfuscation and dividing the data as described herein, even with a successful unauthorised access, the data is of no value without the translation table Furthermore, data storage in the cloud does not negate from the true meaning of the content—statistical analysis can still be performed on the content without any linkage or reference back to the personal information stored within the residue/translation table.

With reference to FIG. 1, the scheme works by 'domainizing' (splitting into groups) the personal data and additionally by fitting the financial element of a client's data to a pre-determined/characteristic profile, and recording the deviations from this characteristic profile. Multiple characteristic profiles may also be used as will be described later.

This process yields two distinct group types. The first group contains the UIDs assigned to personal data (herein referred to as data identifiers), plus UID's assigned to each element of the deviation of a client's financial information (herein referred to as deviation identifiers) from that of the closest matching reference profile. There may be a number of reference financial profiles, each customer matched to the most appropriate approximation. The use of reference records allows data to dynamically normalizes itself around specific data content. This is akin to hiding data in a tightly packed cohort of peers.

The second group contains a table of string values and related UID's: a dictionary (or residue) providing the translation table.

It is only by combining the identifiers with the translation table that we get back to the original database of personal data—i.e. only by combining information in both groups (identifiers and translation table) that the original data is reconstructed and any understanding then derived.

Privacy is achieved by separating the two types of data and physically securing the translation table ("stock cube") data according to standard practices of any organisation today in possessing of such information. The group of identifiers ("water vapour") grows in direct proportion to the number of customers. The translation table ("stock cube") is orders of magnitude smaller as strings of data relating to things like name, address, occupation etc will repeat. This translation table is in essence a dictionary of phrases and numerical values and can be stored in any arrangement appropriate for storing such information.

Further, as data grows in volume, profiling will reveal repeating associations of UIDs (identifiers) within the first group of UID sequence data, the result is a level of data normalisation that cannot be achieved by design alone. The greater the number of clients in the database and the greater the attributes known about them the greater the propensity for detailed domain normalisation. This in itself will form a useful level of obfuscation.

This is a dynamic data normalization facility where patterns are recognised in real-time data leading to a level of normalization of data that could not occur using traditional database design techniques.

As new detailed associations of UIDs (identifiers) across slices of data are discovered, the existing group of UIDs data will have the ability to adjust its structure accordingly. The effect is to further compress the cohorts of data, reducing storage volume, data mining dimensions, and more importantly allowing more essence to be extracted from the group of UID sequences ("water vapour") and deposited into the translation table ("stock cube"). The group of UID sequences providing identifiers ("water vapour" group of data) will be placed in the Cloud and consequently may reside anywhere in the world. This has the commercial advantage that data storage can scale infinitely and quickly, and cloud compute clusters can be leveraged to crunch data.

The translation table ("stock cube" group of data) will be kept within an organisation or on specific devices authorised by the organisation. The devices will be only used inside of the appropriate geographic territory by an authorised person. As the translation table may typically be orders of magnitude smaller in size to the data identifiers storing the main body of data local storage and computer power is reduced, with the increased storage demands pushed out to remote cloud computing platforms. This means that the data that forms the translation table stays within the physical protection of the organisation or on machines that reside within a guaranteed territory with sufficient security to guarantee they are used only by authorised personnel (i.e. reflecting today's privacy laws). Authorised persons may use devices such as desktop computers, corporate servers, tablet style computing devices or even smartphones and the like to store or access the data.

The group of UID sequences providing identifiers ("water vapour" group of data) is combined with the translation table ("stock cube" group of data) on the device residing in the specified territory by an authorised and regulated person.

Data will be first entered by an authorised and regulated person; software on the device will split out the data into the identifiers and translation table. The identifiers are pushed to the Cloud and any addition to the translation table is merged with the existing translation table data on the device.

Where there is a requirement for mass induction of client data, the scheme is defined to place the human data controller in electronic control of the load process such that her interaction with the device initiates the domainization of the data and it's dispersal to the Cloud.

The scheme allows for the translation table group of data to be stored centrally within the standard computing environment of the organisation by allowing data from multiple devices to be synchronised and merged centrally. This means as a domain expands on one device it will subsequently become available to all devices.

Data in both the UID group and translation table group may have unlimited layers of privacy enhancing technology (PET) applied to them. Data in the first group (in its raw form) is a base series of UIDs, plus UID encoding of deviations from a common financial profile (herein referred to as deviation identifiers). Additive PETs provide the mechanism by which further obfuscation and encryption can take place on the UID data.

This scheme is very different from today's traditional one time encryption techniques where all eggs are in one basket. In the traditional model if the cipher is broken then all the content is revealed in plain text. The proposed model has a fundamental principle of data at its core followed by an unlimited number of organisational driven PETs. Each PET obfuscates meaning and places plain text a further step away.

Fundamentally the scheme allows the essence of the data to be stored in a protected environment and distinct from the mass of data globally at large.

One PET for example may be common day encryption techniques: others may be more esoteric like modern day equivalents of the Enigma machine, with many more wheels, extended character sets, and plug boards. The approach of obfuscation and division of data herein described allows for an organisation to apply other forms of PET such as standardised forms of encryption such as public key encryption or their own proprietary standards. This is useful as it provides additional levels of protection against unwanted and illegal attempts to access the data and understand its meaning Domainization—The following tables show the process of forming the translation tables and UIDs.

Table 1 below shows a typical subset of tables of customer data—the data that is to be anonymised. Three clients are shown: client #1, client #2 and client #3.

Various personal and financial data fields are present for each client that need to be protected/obfuscated before being uploaded to the cloud storage.

TABLE 1

| | PERSON | | | | | | |
|---|---|---|---|---|---|---|---|
| | client names (first, middle, surname) | Will? | no of children | income | spouse income | household monthly expenditure | family income protection |
| client #1 | homer stephen simpleton | Will | 1 | 35000 | 10000 | 950 | 67.54 |
| client #2 | donald stephen drake | Nothing | 2 | 45000 | 2000 | 1150 | 55.15 |
| client #3 | mark smithers | Nothing | 1 | 12320 | 0 | 950 | 0 |

TABLE 1-continued

PERSON

| | client names (first, middle, surname) | buildings and contents protection | mortgage debt | savings | investments | pensions |
|---|---|---|---|---|---|---|
| client #1 | homer stephen simpleton | 235 | 102300 | 6000 | 0 | 0 |
| client #2 | donald stephen drake | 265 | 130000 | 8000 | 0 | 20000 |
| client #3 | mark smithers | 0 | 0 | 120000 | 585000 | 0 |

TABLE 2

PROFILES

| | client names (first, middle, surname) | Will? | no of children | income | spouse income | household monthly expenditure | family income protection |
|---|---|---|---|---|---|---|---|
| income matches earnings | young family subsistence | Nothing | 2 | 40000 | 5000 | 975 | 60 |
| typically 3 buy to lets | young buy to let | Nothing | 0 | 40000 | 0 | 700 | 0 |
| typically 7 buy to lets | older buy to let | Will LPA | 2 but left home | 60000 | 15000 | 1200 | 0 |
| use of financial instruments | sophisicated investor | Will LPA | 2 but left home | 100000 | 20000 | 2000 | 0 |
| sophisicated but reflects wife looks after kids whilst they grow up | complementary male/female - husband | Will | 2 but left home | 75000 | 25000 | 2000 | 0 |
| | complementary male/female - wife | LPA | 2 but left home | 25000 | 75000 | 2000 | 0 |
| has 'enough' to take to end of life without little effort (no dependents) | lifestyle content (happy) | Nothing | 0 | 10000 | 0 | 1000 | 0 |

| | client names (first, middle, surname) | buildings and contents protection | mortgage debt | savings | investments | pensions |
|---|---|---|---|---|---|---|
| income matches earnings | young family subsistence | 250 | 110000 | 5000 | 0 | 0 |
| typically 3 buy to lets | young buy to let | 155 | 100000 | 5000 | 0 | 0 |
| | | 155 | 150000 | | | |
| | | 155 | 200000 | | | |
| typically 7 buy to lets | older buy to let | 155 | 10000 | 60000 | 100000 | 80000 |
| | | 155 | 15000 | | | |
| | | 155 | 20000 | | | |
| | | 155 | 25000 | | | |
| | | 155 | 25000 | | | |
| | | 155 | 25000 | | | |
| | | 155 | 25000 | | | |
| use of financial instruments | sophisicated investor | 350 | 0 | 120000 | 750000 | 1000000 |

TABLE 2-continued

PROFILES

| | | | | | | |
|---|---|---|---|---|---|---|
| sophisicated but reflects wife looks after kids whilst they grow up | complementary male/female - husband | 350 | 0 | 100000 | 750000 | 750000 |
| | complementary male/female - wife | 350 | 0 | 30000 | 250000 | 250000 |
| has 'enough' to take to end of life without little effort (no dependents) | lifestyle content (happy) | 200 | 0 | 80000 | 500000 | 120000 |

TABLE 3

PROFILE PERTURBATION

| | client names (first, middle, surname) | Will? | no of children | income | spouse income | household monthly expenditure | family income protection |
|---|---|---|---|---|---|---|---|
| client #1 matched to 'young subsistence income' | homer stephen simpleton | Will | −1 | −5000 | 5000 | −25 | 7.54 |
| client #2 matched to 'young subsistence income' | donald drake | | 0 | 5000 | −3000 | 175 | −4.85 |
| client #3 matched to 'lifestyle content' | mark smithers | | 1 | 2320 | 0 | −50 | 0 |

| | client names (first, middle, surname) | buildings and contents protection | mortgage debt | savings | investments | pensions |
|---|---|---|---|---|---|---|
| client #1 matched to 'young subsistence income' | homer stephen simpleton | −15 | −7700 | 1000 | 0 | 0 |
| client #2 matched to 'young subsistence income' | donald drake | 15 | 20000 | 3000 | 0 | 20000 |
| client #3 matched to 'lifestyle content' | mark smithers | −200 | 0 | 40000 | 85000 | −120000 |

At this stage we see 2 rows per person in which one reflects value in orders of magnitude appropriate for the type of data the second rows record the excess or froth.

TABLE 4

| | client names (first, middle, surname) | Will? | no of children | 1000s income | 1000s spouse income | 100s household monthly expenditure | 10s family income protection |
|---|---|---|---|---|---|---|---|
| | | | | PROFILE PERTURBATION (numbers clipped and represent order of magnitude) (quantity normalization) | | | |
| client #1 matched to 'young subsistence income' | homer stephen simpleton | Will | −1 | −5 | 5 | 0 | 0 |
| client #1 matched to 'young subsistence income' | homer stephen simpleton | Will | 0 | 0 | 0 | −25 | 7.54 |
| client #2 matched to 'young subsistence income' | donald drake | Nothing | 0 | 5 | −3 | 1 | 0 |
| client #2 matched to 'young subsistence income' | donald drake | Nothing | 0 | 0 | 0 | 75 | −4.85 |
| client #3 matched to 'lifestyle content' | mark smithers | Nothing | 0 | 2 | 0 | 0 | 0 |
| client #3 matched to 'lifestyle content' | mark smithers | Nothing | 1 | 320 | 0 | −50 | 0 |

| | client names (first, middle, surname) | 10s buildings and contents protection | 1000s mortgage debt | 1000s savings | 1000s investments | 1000s pensions |
|---|---|---|---|---|---|---|
| | | PROFILE PERTURBATION (numbers clipped and represent order of magnitude) (quantity normalization) | | | | |
| client #1 matched to 'young subsistence income' | homer stephen simpleton | 0 | −7 | 1 | 0 | 0 |
| client #1 matched to 'young subsistence income' | homer stephen simpleton | −15 | 700 | 0 | 0 | 0 |
| client #2 matched to 'young subsistence income' | donald drake | 0 | 20 | 3 | 0 | 20 |
| client #2 matched to 'young subsistence income' | donald drake | 15 | 0 | 0 | 0 | 0 |
| client #3 matched to 'lifestyle content' | mark smithers | −20 | 0 | 40 | 85 | −120 |

TABLE 4-continued

| | | | | | | |
|---|---|---|---|---|---|---|
| client #3 matched to 'lifestyle content' | mark smithers | 0 | 0 | 0 | 0 | 0 |

THE DATA WE STORE FOLLOW BELOW

TABLE 5

(STORED TO CLOUD IN THIS FORM)

PROFILE PERTURBATION
(with string domainization)

| | | | | | | | |
|---|---|---|---|---|---|---|---|
| client #1 matched to 'young subsistence income' | 817413026 757739110 232754115 | 234164724 | 930071094 | 792441855 | 983704673 | 422457101 | 422457101 |
| client #1 matched to 'young subsistence income' | | | 0 | 0 | 0 | −25 | 7.54 |
| client #2 matched to 'young subsistence income' | 245060467 757739110 168182192 | 679055516 | 422457101 | 983704673 | 646002909 | 22658639 | 422457101 |
| client #2 matched to 'young subsistence income' | | | 0 | 0 | 0 | 75 | −4.85 |
| client #3 matched to 'lifestyle content' | 13540256 690500610 | 679055516 | 422457101 | 827516500 | 422457101 | 422457101 | 422457101 |
| client #3 matched to 'lifestyle content' | | | 1 | 320 | 0 | −50 | 0 |

PROFILE PERTURBATION
(with string domainization)

| | | | | | | | |
|---|---|---|---|---|---|---|---|
| client #1 matched to 'young subsistence income' | 817413026 757739110 232754115 | 422457101 | 938631754 | 22658639 | 422457101 | 422457101 | |
| client #1 matched to 'young subsistence income' | | −15 | 700 | 0 | 0 | 0 | |
| client #2 matched to 'young subsistence income' | 245060467 757739110 168182192 | 422457101 | 599634554 | 91145402 | 422457101 | 599634554 | |
| client #2 matched to 'young subsistence income' | | 15 | 0 | 0 | 0 | 0 | |
| client #3 matched to 'lifestyle content' | 13540256 690500610 | 963841943 | 422457101 | 933100774 | 324423887 | 752154942 | |
| client #3 matched to 'lifestyle content' | | 0 | 0 | 0 | 0 | 0 | |

TABLE-6

| (STORED LOCALLY) | DOMAIN TABLE |
|---|---|
| homer | 817413026 |
| stephen | 757739110 |
| simpleton | 232754115 |
| donald | 245060467 |
| drake | 168182192 |
| Will | 234164724 |
| Nothing | 679055516 |
| mark | 13540256 |
| smithers | 690500610 |
| −1 | 930071094 |
| −5 | 792441855 |
| 5 | 983704673 |
| 0 | 422457101 |
| −7 | 938631754 |
| 1 | 22658639 |
| −3 | 646002909 |
| 3 | 91145402 |
| 20 | 599634554 |
| 2 | 827516500 |
| −20 | 963841943 |
| 40 | 933100774 |
| 85 | 324423887 |
| −120 | 752154942 |

Table 2 above shows a set of characteristic profiles, each providing a reference record. Example characteristic profiles include: 'a young family subsistence', "lifestyle content' and 'young/old buy to let investors'. In both the building/contents protection and mortgage debt columns multiple entries are stored and each relate to a particular property owned by the buy to let investor.

Fitting to a Reference Profile

This is the act of taking personal and financial information and comparing each type to the groups already identified in the database as a whole. As data grows in volume, profiling can become more sophisticated and subtle, leading to groups and subgroups of individuals thereby providing multiple profiles/reference records.

What happens as part of the profiling piece is best described with a simple example. As new details are entered, a person's income, assets, and liabilities are accessed using a rule based decision tree. At the first stage we determine whether they have many assets and little debt, or vice versa. Of the indebted customers then removing the mortgage from the equation may push them into the asset rich group. We then become interested in the asset and debt profiles and the levels. Indebtedness will have a correlation with protections required and protections obtained and so on. From this simple rules based assessment, a person's financial statement is assigned to a pool of most similar people.

At any point in time the pool has a prototype person, the ideal for the pool, such as 'young family subsistence' or 'lifestyle content' (each being stored as a reference record for example). All real members (client #1, #2 etc) are measured by their perturbations from the prototype. The pool number and perturbations for each client may be recorded for subsequent decoding of the data. Before storage the pool and perturbation information are domainized as described above, i.e. turned into two groups of data identifiers and translation tables as shown in Tables 3 to 6 above.

Figure 2:
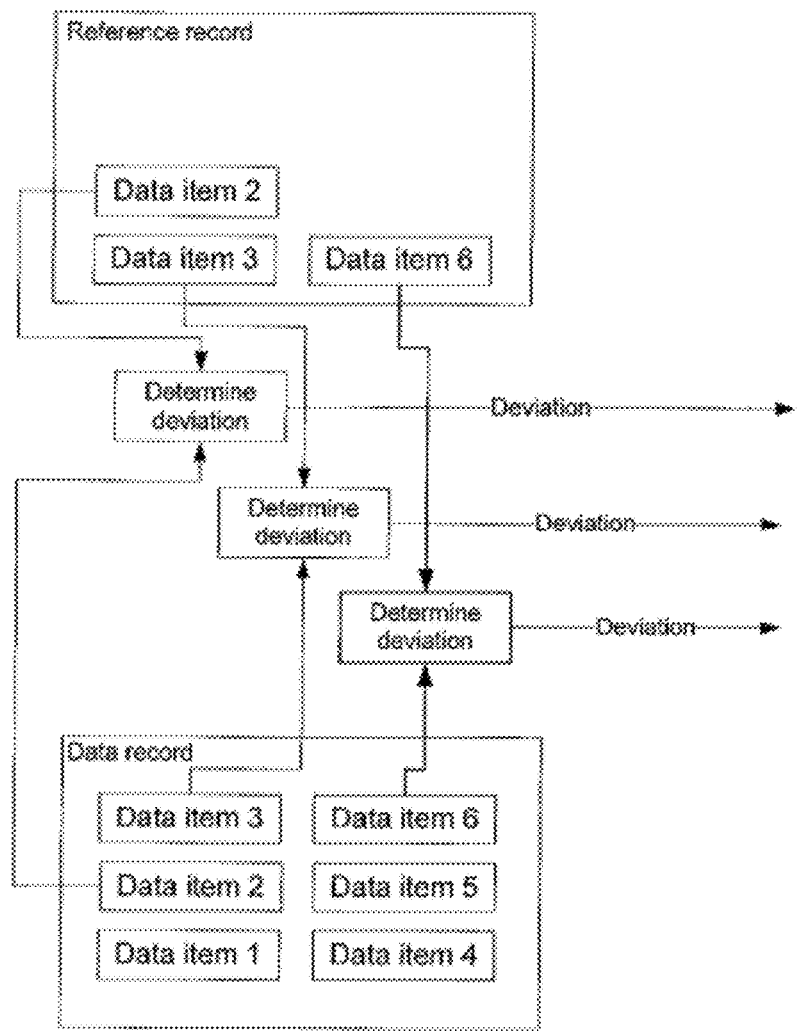
FIG. 2 shows the process of determining deviations in data items.

FIG. 2 shows an embodiment of how deviations are determined relative to the profile/reference record. Numerical data items pertaining to financial information are each compared to reference values in the reference record (for example data item 3 with reference data item 3), the deviation determined and then output. The deviation is then assigned a deviation identifier and stored within the cloud along with the identifiers for any non deviation data (for example for names, addresses).

Figure 3:
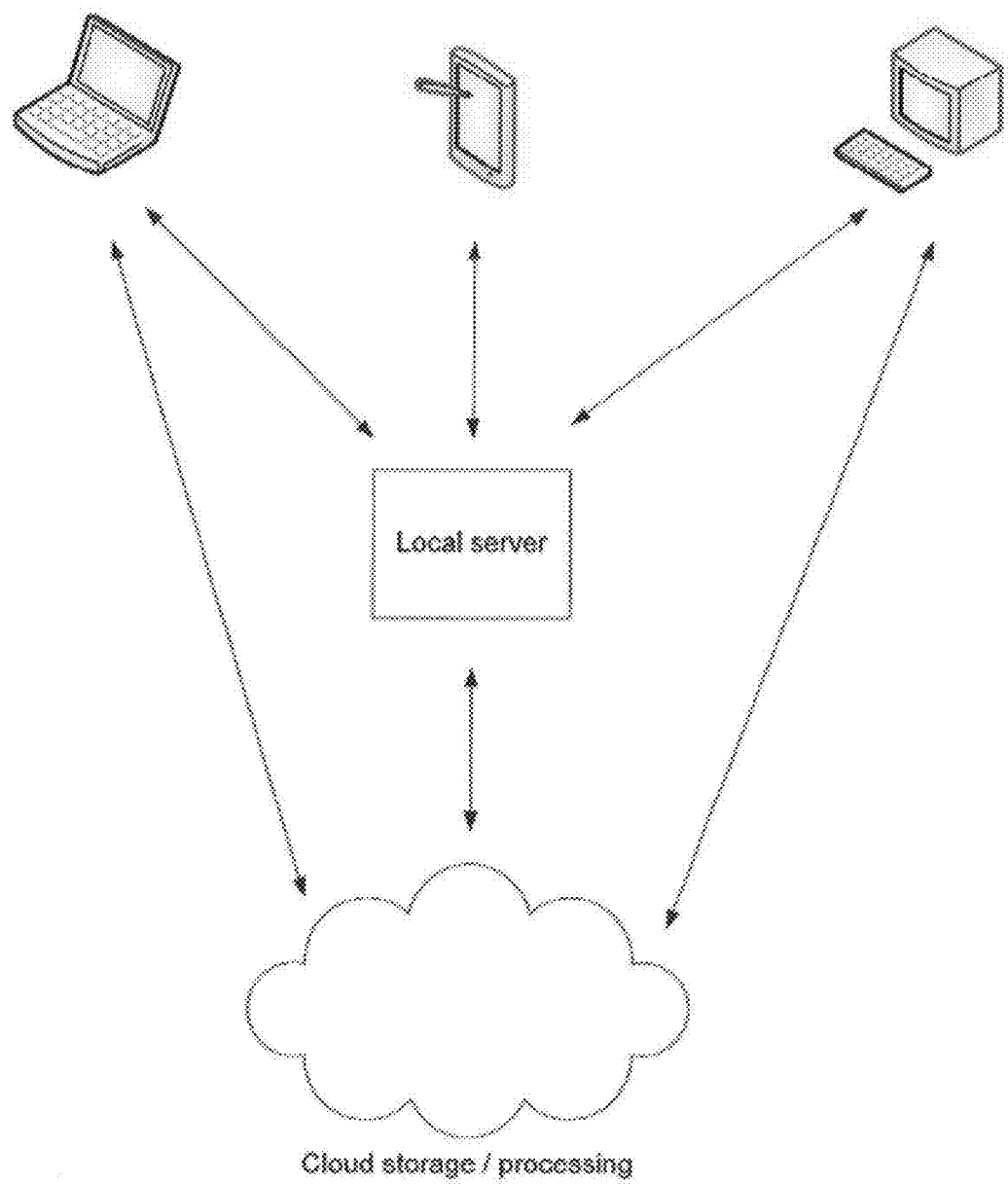
FIG. 3 shows the typical system implementing embodiments of the invention.

In Table 3 the deviation of data fields to the most relevant reference record is determined. The most relevant (closest matching for example) reference record for client #1 and client #2 in FIG. 3 is the 'young family subsistence' profile and thus deviations for each numerical value are determined relative to this profile/reference record. For example, client #1 has an income of £35000 and the 'young family subsistence' profile defines a reference income of £40000. The resulting profile perturbation calculated is −£5000.

In the following step, shown in Table 4, two rows of data are now shown per person. The first row represents values of the data in orders of magnitude and the second the excess or remainder having determined the orders of magnitude. For example, client #3 has an income of £12320 from table 1, which converts to a deviation from the 'lifestyle content' profile of £2320. In table 4, the magnitude value determined is 2 (from £2000), providing an excess of £320.

Tables 5 and 6 show the data finally stored after the processing is complete. The essence of the data (the domain) is stored securely by the organisation and made available to data controllers. This is the translation table ("stock cube" set of data) effectively providing a dictionary. Table 5 shows an example of derived UIDs (data identifiers) stored in cloud storage. This data is now anonymised and this is capable of being remotely stored whilst being in compliance with many different territorial data protection laws. Table 6 shows an example of the translation table (domain table) stored locally that allows the decoding to take place. In this example each alphanumeric data item is assigned a unique ID, and numerical values are also assigned a unique ID. The result is that the data is partitioned so that the bulk of the data is can be stored remotely and only the table that allows the true personal and financial data to be derived needs to be stored in the local jurisdiction.

Reassembly of the Data

Data is reassembled by the data controller using software tools on a device local to the data controller (such as a client machine, which may be a desktop computer, corporate server, tablet style computing device or even smartphones and the like) and within the appropriate geographical territory. Data arrives back from the cloud and onto the device as a sequence of meaningless UIDs/identifiers. The reverse of each PET is applied to the stream to reveal the real underlying and still meaningless sequence of UIDs. The on-device translation table (the "stock cube" of data) is combined with the de-obfuscated UIDs/identifiers ("water vapour set") on the device and under the control of the data controller. The real data is revealed, the pieces having been reassembled by the data controller on machines local to the data controller.

Role of the Data Controller

The data controller is a person within the organisation who is authorised from a compliance perspective to work on behalf of the organisation with its clients' personal data. Legally it is only a data controller that can dissolve real data into its UIDs/identifiers ("water vapour") and translation table ("stock") components, and in turn combines the underlying parts back into real data again.

The data controller uses the software tools to achieve the split, dispersal and reassembly.

Figure 4:
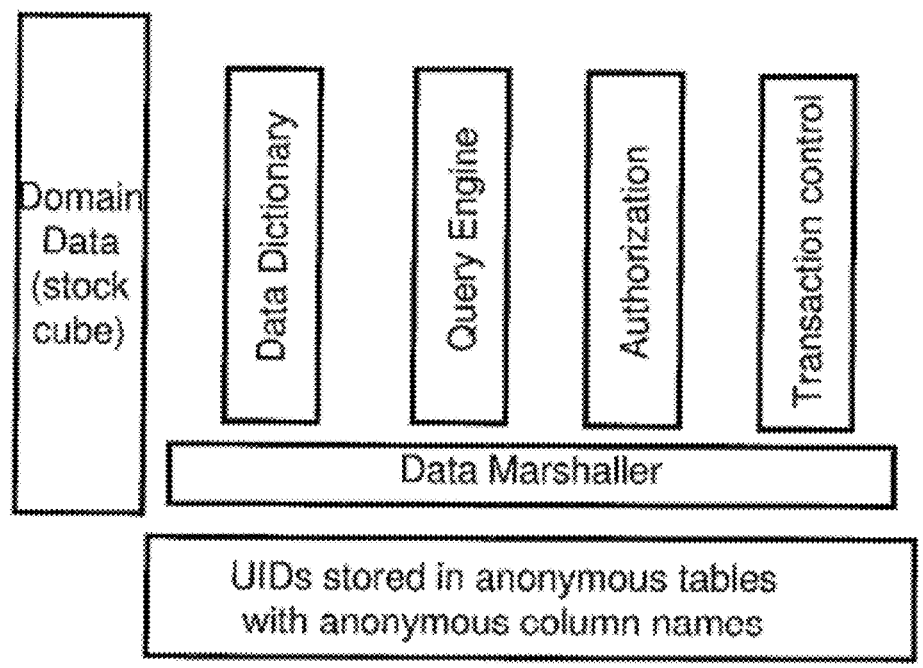
FIG. 4 shows an example of the database management system (DBMS).

FIG. 4 shows an example of the database management system (DBMS) used to enable the new mechanisms described herein. This approach allows for a new style of database whereby the DBMS and distilled data (forming the translation table) are stored locally and the cloud is used as a massively expandable and connected storage 'disk'. As described herein simply moving storage to a cloud computing environment is not possible without anonymisation/obfuscation due to territorial restrictions on data storage to ensure compliance with data protection requirements.

Anonymous data elements are stored in the cloud database (DB) and are viewed by the DPMS in the same way the bytes on a magnetic disk of a conventional database are viewed. The sequence of UIDs can be considered to be the raw data of the DBMS.

Data is stored as a sequence of UIDs in anonymous tables using anonymous column names, preferably in remote cloud storage as previously described. This is the rawest form for this model—in some configurations there will already be indexing and transaction facilities in place at the hosting cloud provider to allow indexing and transactions to be dealt with within the cloud environment.

By abstracting the approach to data storage into a conventional database type of pattern, the DBMS provides all the benefits of modern data access to our storage scheme and removes the requirement for a given application to encode its data access in a way specific to this invention's storage scheme, i.e. the DBMS performs the abstraction to generate the identifiers to be stored on the cloud computing platform and the translation table to be stored locally.

There are five major elements of the DBMS: Data Dictionary; Query Engine; Authorization; Transaction Control/Engine; and Data Marshaller. These functional capabilities work with the core elements of the domainized data and the sequences of UIDs stored out in the cloud.

The Data Dictionary holds the translation table with information that maps a meaningful logical data model into the structure used to store UIDs in the cloud. For example, a table named t101 could hold Mortgage information and col73 in table t101 could contain the outstanding loan amount.

The Data Dictionary intrinsically supports profile types. The dictionary defines each of the profile types against which an individual client data perturbation is calculated and translated into UIDs, i.e. the subsequent perturbations may be derived from the reference records and reference data items which define the characteristic profile types. Furthermore, the dictionary may support inheritance and so for example investment types ISAs, OEIC, Stocks can be classified as 'financial assets'.

By using the information contained in the Data Dictionary the Query Engine is able to translate data operations expressed in terms of the full logical data model into operations against both the domain data store (the translation table) and the anonymous UID based data store (the deviation identifiers stored in cloud storage). This allows the Query Engine to process the deviation identifiers, the translation table and any reference records in order to reconstitute/determine the original data entries.

The Dictionary is used to phrase data operations expressed in terms of super types like 'financial assets' and further profile types like "young family subsistence living" type. So a query such as 'find all "young family subsistence living" that do not have a FIB protection' can be implemented.

The Transaction Engine performs the transmission and retrieval of data to and from the remote cloud storage. Furthermore, it may also be used to retrieve the translation table and reference record(s). The Transaction Engine is important when writing data as it is used to ensure consistency between the cloud store and the domainized data.

In addition this hybrid cloud data store offers the ability to manage audit and authorization (using the Authorization Engine) as well as transaction consistency between the domain data store and the UID cloud store. This enables transaction verification and encryption to be implemented. One or more layers of encryption could be applied, dependent on the requirements of the user.

The Data Marshaller is used to manage the structure of the underlying cloud storage facility. This includes the capability to enable the database to adjust its storage structure as patterns are discovered in the data leading to new profiles and new perturbation structures. For example, a newly added reference record could be identified as a new pattern or general trend is observed. This could be uploaded via the Data Marshaller which then interrogates and updates the entries throughout the system to fully integrate this new reference record—this may include redetermining deviations of one or more data items in the data records based upon this new reference record for example.

Profiles (from which the reference records are derived) are not simply strata of society, but they have a 'shape' in terms of the logical normalized data structures we would expect to see example of within the profile. Further, the profile would need a base set of a data. The example profile of "young family subsistence living" contains the following products: mortgage of around 140 k; FIB for a family of two adults and two children; house buildings and contents insurance; a salary of around 35 k per annum; a small amount of savings. The cloud storage structures represent the UID encoded perturbations from such a profile. Data mining will reveal adjustments to the profiles and new profiles also, causing the raw cloud storage structures to be rebalanced. The Data Marshaller takes care of this, whilst the rest of the DBMS abstracts any application from this dynamic adjustment via the Data Dictionary.

PETs

Careful choice of PETs will still leave the UIDs/identifiers ("water vapour" data) in a state that is meaningful for data mining and predictive analysis. Further, the numerical nature of the data and the dynamic normalisation capability facilitates efficient mining processes.

Practical Implementation

The device containing the capabilities to store the translation table and receive the identifiers is in a specific territory (e.g. UK), further containing an application code to process the translation table and identifiers. Access to the device is restricted to the human data controller. Whilst containing the application, in our example, the device is never taken out of the UK. In the UK, these levels of device security are no different to those required today in respect of the Financial Services Authority (FSA) and the data controller's organisation.

The translation table ("stock cube" group of data) is resident on the device and is synchronised with the master copy on servers within the organisation. This data is small in size and easy fits into the memory of a portable device, such as a table style computer. FIG. 3 shows an example of a typical system including client computers held within the relevant geographical state (UK for example) so as to comply with national data protection and privacy laws. The local server is also stored within the same geographical state and may optionally store a master copy of the translation table which can be transferred to the client computing machines as and when the information is needed thereby maintaining a master copy. Alternatively the individual computing machines may permanently store a copy and update the server copy if content is modified. Each client computing machine may download data from the remote server within the cloud computing environment either directly or via the local server (should the provider of the information wish to track and log who is downloading the information for example) to obtain a copy of the identifiers necessary to decode the data.

The application then freely works with the UIDs ("water vapour" group of data) in the cloud using a secure (SSL) connection to push and pull UIDs at a set number of levels of PET. Searches can be performed and meaningless streams of UIDs are returned to the device.

On the device, layers of PETs are removed by applying the antidote to each layer in turn, to reveal the underlying real set of UIDs. UIDs are then translated on the device into actual data using the on-device translation table ("stock cube") data set.

Dynamic Normalization

The discussion has set out a scheme where a person's financial story is represented as a sequence of UIDs/identifiers in the cloud.

From this position the data will then be subject to a pipeline of numerical and predictive analysis techniques. As such patterns in the data will be detected at various stages in the pipeline. For example, values x,y,z in columns 1,2,3 may have a propensity to indicate that a value of 7 always appears in column 23.

Discoveries of this form leads to a further refactoring of the data—traditionally this would be called data normalization when applied to the review of a database structure by a "data analyst". What we are doing here is quite different, we are normalising based on the discovery of patterns in real-time and within real datasets.

This is in part facilitated by today's dynamic schema-less storage structures which provide the mechanism for the programmatic adjustment of the storage structure.

It will be appreciated that although the examples herein described refer particularly to financial information such as pensions, shares and banking data and the like that the system is application to any forms of data, in particular any information containing personal information (such as store cards, inland revenue data, medical data and home office/government data) that must comply with national data protection laws.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A computer-implemented method of anonymising a database of personal data, the database comprising a plurality of data records, each data record comprising a plurality of data items, the method comprising;
   for a subset of data items in said data records, determining a deviation of each of said data items in said data records relative to reference data items in a plurality of reference records,
   wherein one of said plurality of reference records is selected for each one of said data items or subset of data items dependent on a similarity of a said data record to said reference records, wherein determining said similarity comprises:
      categorizing said data items in said data records into a plurality of pools based on classification profiles defined by said reference records, wherein a data item similarity of data items in a said pool is above a threshold; and
      comparing calculated perturbation profiles of one or more of said data items in a said pool with one or more of said reference data items of said reference records,
   wherein each of said data items in said data records has a corresponding said reference data item in a said selected reference record according to a said classification profile to determine a said deviation of a said data item relative to a said reference data item in a said selected reference record,
   assigning deviation identifiers to each of said determined deviations in said data records to identify a said data item being recorded as a said determined deviation to a said reference data item and to anonymise said data items in said subset of data items in said data records;
   generating a translation table mapping said data items in said subset and said determined deviations to said deviation identifiers;
   storing said translation table; and
   storing said deviation identifiers defining said anonymised data items for said data records remotely to said translation table.

2. The method as claimed in claim 1 further comprising:
   assigning data identifiers to a second subset of said data items in said data records to anonymise said data items in said second subset of said data items in said data records;
   wherein said generating said translation table further comprises mapping said data items in said second subset to said data identifiers; and
   further comprising storing said data identifiers remotely to said translation table.

3. The method as claimed in claim 1 further comprising generating said reference record, wherein said generating comprises determining one or more reference data items defining a characteristic profile of data suitable for storing in said database.

4. The method as claimed in claim 3, wherein said characteristic profile is dependent on one or more of said plurality of data records and wherein said characteristic profile is dynamically updated dependent on a further one or more of said plurality of data records.

5. The method as claimed in claim 1, further comprising:
   assigning reference data identifiers to said reference data items; and
   storing said reference data identifiers remotely to said translation table;
   wherein said translation table further stores a mapping of said reference data items to said reference data identifiers.

6. The method as claimed in claim 1 wherein one of said data items in said data record comprises a marker, wherein said marker defines said reference record used to determine said deviation.

7. The method as claimed in claim 1 wherein said translation table is stored on a client machine, and said deviation identifiers are stored on a remote data server; and
   wherein said data identifiers are stored on said remote data server and/or wherein said remote data server is located within a remote cloud computing platform.

8. The method as claimed in claim 1 further comprising encrypting one or more of said translation table and said deviation identifiers; and
   wherein said storing comprises storing said encrypted one or more of said translation table and said deviation identifiers.

9. The method as claimed in claim 2 further comprising encrypting said data identifiers and
   wherein said storing comprises storing said encrypted data identifiers.

10. The method as claimed in claim 8 further comprising applying one or more further layers of encryption, in particular wherein one of said one or more further layers of encryption is a proprietary format.

11. The method as claimed in claim 1, wherein said data items in said data records are arranged into fields; and said determining a deviation comprises determining a deviation of each of said data items relative to a data item in a corresponding field in said reference record.

12. The method as claimed in claim 2, wherein said second subset of data comprises data defining personal data and said subset of data comprises financial data linked to said personal data, and wherein a said reference record comprises a common financial profile comprising pre-characterized financial data.

13. A computer-implemented method of decoding a database of personal data, wherein said database of personal data is anonymised, the database comprising a plurality of data records, each data record comprising a plurality of data items, the method comprising:

retrieving deviation identifiers for a subset of said data items in remote data record from remote storage, wherein said deviation identifiers define anonymised deviations for each of said data items in said data records relative to reference data items in a plurality of reference records, wherein one of said plurality of reference records is selected for each one of said data items or subset of data items dependent on a similarity of a said record to said data record to said reference records, wherein determining said similarity comprises:

categorizing said data items in said data records into a plurality of pools based on classification profiles defined by said reference records, wherein a data item similarity of data items in a said pool is above a threshold; and comparing calculated perturbation profiles of one or more of said data items in a said pool with one or more of said reference data items of said reference records;

wherein each of said data items in said data records has a corresponding, said reference data item in a said selected reference record according to a said classification profile to determine a said deviation of a said data item relative to a said reference data item in a said selected reference record;

retrieving a translation table from storage, wherein said storage is distinct to said deviation identifiers, and wherein said translation table defines a mapping of said data items in said subset and said determined deviations with said deviation identifiers;

processing said deviation identifiers using said selected reference record and said translation table to decode said database of personal data;

wherein said processing comprises performing a reverse mapping of said deviation identifiers to deviations of each of said data items in said subset of data items and, using said selected reference record and said deviations, determining said data items in said subset of data items.

14. The method as claimed in claim 13 further comprising:

retrieving data identifiers for a second subset of said data items in said remote data record from said remote storage, said data identifiers defining anonymised data items in said remote data record;

wherein said translation table further defines a mapping of said data items in said second subset with said data identifiers;

wherein said storage of said translation table is distinct to said data identifiers;

wherein said processing further comprises processing said data identifiers and said translation table to decode said database of personal data; and wherein said processing further comprises performing a reverse mapping of said data identifiers to said data items in said second subset of data items.

15. The method as claimed in claim 13, wherein said translation table further maps said reference data items to reference data identifiers;

the method further comprising:

retrieving said reference data identifiers from remote storage; and processing said reference data identifiers using said translation table to perform a reverse mapping of said reference data identifiers to said reference data items for said reference record.

16. The method as claimed in claim 13 wherein one of said data items in said data record comprises a marker defining said selected reference record used to determine said anonymised deviation, and wherein said processing further comprises determining said selected reference record from said plurality of reference records by reading said marker.

17. The method as claimed in claim 13 wherein said processing comprises determining said selected reference record from said plurality of reference records based on a difference determined between said deviations in at least one of said data items in said subset and at least one of said reference data items in said plurality of reference records.

18. The method as claimed in claim 13, wherein said translation table is stored on a client machine and said deviation identifiers are stored on a remote data server.

19. The method as claimed in claim 14, wherein said data identifiers are stored on a remote data server; and wherein said remote data server is located within a remote cloud computing platform and/or wherein said translation table is stored remotely to said remote data server and downloaded to said client machine during said retrieving of said translation table from said storage.

20. The method as claimed in claim 13 wherein one or more of said translation table and said deviation identifiers are encrypted, and wherein said processing further comprises decrypting said one or more of said translation table and said deviation identifiers prior to decoding said database of personal data.

21. The method as claimed in claim 14 wherein said data identifiers are encrypted, and wherein said processing further comprises decrypting said data identifiers prior to decoding said database of personal data.

22. A database management system for decoding a subset of data items in data records from a distributed database, said database management system comprising a distributed storage system, wherein said distributed storage system comprises a memory which stores said distributed database, the distributed database comprising:

a plurality of deviation identifiers storing anonymised references to deviations in a subset of data items in data records, wherein said deviation identifiers define anonymised deviations of said subset of data items relative to reference data items in a plurality of reference records;

the database management system further comprising a processor configured to select one of said plurality of reference records for each one of said data items or subset of data items dependent on a similarity of a said data record to said reference records, wherein said processor is further configured to determine said similarity, wherein said determination of said similarity comprises:
- categorizing said data items in said data records into a plurality of pools based on classification profiles defined by said reference records, wherein a date item similarity of data items in a said pool is above a threshold; and
- comparing calculated perturbation profiles of one or more of said data items in a said pool with one or more of said reference data items of said reference records, and wherein each of said data items in said data records has a corresponding said reference data item in a said selected reference according to a said classification profile to determine a said deviation of a said data item relative to a said reference data item in a said selected reference record;

the database management system further comprising:
- a data dictionary comprising a translation table storing mappings from said subset of data items and said determined deviations to said deviation identifiers;
- a transaction engine to retrieve one or more of said plurality of deviation identifiers from remote storage, to retrieve said translation table, and to retrieve said selected reference record, wherein said storage of said deviation identifiers is distinct to said translation table;
- a query engine to process said deviation identifiers using said selected reference record and said translation table to decode said distributed database and reconstitute said subset of data items in said data records, wherein said decoding comprises performing a reverse mapping of said deviation identifiers to deviations of each of said data items in said subset of data items and, using said selected reference record and said deviations, determining said data items in said subset of data items.

23. The database management system as claimed in claim 22, further comprising a data marshaller to generate said reference records, wherein said generating comprises determining one or more reference data items defining a characteristic profile of data suitable for storing in said database; and
wherein said characteristic profile is determined from data items stored in said distributed database.

24. The database management system as claimed in claim 23, wherein said data marshaller is further operable to update said deviation identifiers in said distributed database and said data dictionary responsive to said generating of said reference records.

25. The database management system as claimed in claim 22, wherein one or more of said translation table and said deviation identifiers are encrypted, and
wherein said database management system further comprises an authorization engine to decrypt said one or more of said translation table and said deviation identifiers.

* * * * *